(12) United States Patent
Davis

(10) Patent No.: US 6,318,923 B1
(45) Date of Patent: Nov. 20, 2001

(54) STABLE BI-AXIAL PIVOT FLEXURE COUPLING

(75) Inventor: Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/525,202

(22) Filed: Mar. 14, 2000

(51) Int. Cl.[7] .................................................. F16C 11/06
(52) U.S. Cl. ................................ 403/150; 464/51; 464/78; 464/86; 464/97; 464/112
(58) Field of Search ......................... 464/51, 78, 86, 464/97, 112; 403/150, 24, 291, 220, 221, 222, 224, 225, 228

(56) References Cited

U.S. PATENT DOCUMENTS

| | | | |
|---|---|---|---|
| 3,272,492 | * 9/1966 | Jones | 464/84 |
| 3,712,081 | * 1/1973 | Philipp et al. | 464/112 |
| 4,405,184 | * 9/1983 | Bahiman | 403/291 |
| 4,802,784 | * 2/1989 | Brooks | 403/24 |

* cited by examiner

Primary Examiner—Lynne H. Browne
Assistant Examiner—Aaron Dunwoody
(74) Attorney, Agent, or Firm—Robert E. Greenstien

(57) ABSTRACT

A coupling comprises blade flexures that connect two end members through which control rods extend to cross members that are attached near the mid-points of the blade flexures, providing stable-linear load reaction means for use as end pivots for linkages where stick-slip motion is undesirable. The blade flexures are housed in a rigid cage comprising four separators that are attached to end members, and the flexures are attached to the end members by the separators.

3 Claims, 3 Drawing Sheets

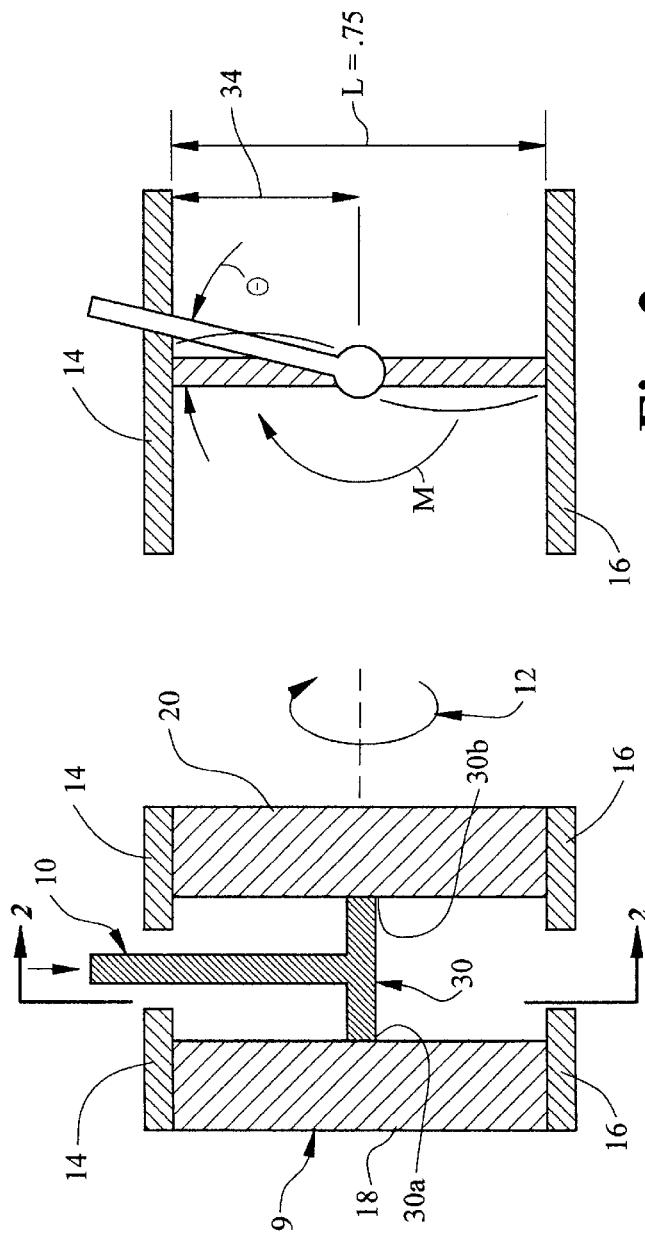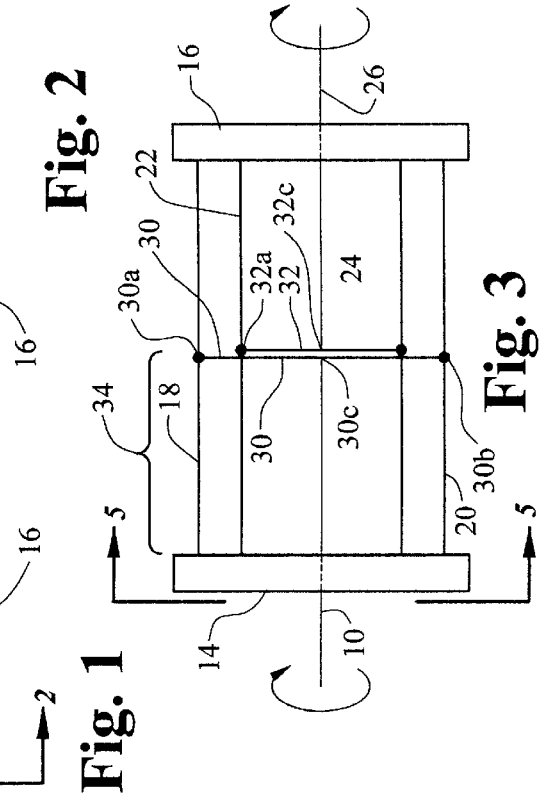

STABLE BI-AXIAL PIVOT FLEXURE COUPLING

TECHNICAL FIELD

This invention relates to devices for providing low friction, rotational couplings, in particular, a stable bi-axial pivot flexure coupling to provide rotationally compliant ends for kinematic linkages.

BACKGROUND

A simple spherical ball and socket connection provides a coupling that is rotationally compliant and axially stiff. A coupling of this type is used as an end fitting for linkages or rods or struts where axial forces must be rigidly transferred, and rotations are relatively unconstrained. The ball and socket end connection is however characterized by large friction losses, making it undesirable for low power, precision coupling and in particular closed loop feedback controls, which can become unstable when too much stick-slip motion is present. Pivot flexures, like the coupling 4 shown in FIG. 4, are generally more useful in those applications. This device operates in a completely linear fashion by means of elastically deflecting flexure blades 4a that produce the desired linkage 4c end rotation with a fixed end or other linkage 4d. Rotational compliance about the two axes orthogonal to the link axis (direction 4b in FIG. 4) is desired thus the term biaxial is often used to describe these flexures. Some rotational compliance about the link axis is also achieved with this type of flexure although it is not critical in most applications Even though blade type pivot flexures have been used successfully, they possess certain performance limitations, in particular weak axial load carrying capacities. To achieve low rotational stiffness, the interleaved blades 4a must be slender which makes them susceptible to buckling under compressive or axial loads, in the direction 4b. To increase their load bearing capacity, the blades 4a conceivably can be made thicker, which makes them less flexible and increases rotational stiffness reducing the coupling's effectiveness. The goal is minimal rotational stiffness, which requires the thinnest possible blades but maximum axial strength.

SUMMARY OF THE INVENTION

An object of the present invention is to provide a biaxial rotational coupling with minimal rotational friction and losses of the blade type and also capable of bearing higher axial compressive loads.

According to the present invention, a stable pivot flexure coupling uses thin flexures (blades) to connect the rotating end members and the pivot joint is located near the midpoint of each flexure.

According to the invention, a flexure coupling comprises a first end member normal to a load axis (i.e., 4b in FIG. 4); a second end member normal to said load axis at a first distance from the second end member; an aperture in said first end member on said axis; an aperture in said second end member on said axis; first and second flexures connecting said end members, said first and second flexures being parallel to said load axis and diametrically opposed; third and fourth flexures connecting said end members, said third and fourth flexures being parallel to said load axis and diametrically opposed; a first cross member normal to said load axis and connected near the midpoints of the first and second flexures; a first rod along said axis and extending through the aperture in said first end member and attached to said first cross member; a second cross member normal to said axis and connected near the midpoints of the third and fourth flexures; a second rod along said axis and extending through the aperture in said second end member and attached to said second cross member, both said first and second rods are used to attach the coupling to a linkage and/or desired fixed mounting point where the device may operate to transfer axial loads rigidly between said hardware while allowing relative unconstrained or compliant rotations.

According to one aspect of the invention four axial connecting rigid spacers, diametrically arranged, secure the first and second end members with the flexures located between the end members and the spacers to form a cage for the flexures.

According to one aspect of the invention, each flexure is formed with base at each end which is secured to the end members with the rigid spacers.

A benefit of the invention is that each blade flexure reacts axial loads in both compression and tension. As a result, flexure failure, i.e., failure of a blade, can only occur when the elastic limit of the flexure material is reached.

With the benefit of the previous discussion of the invention, one of ordinary skill in the art may be able to modify the invention in whole or in part without departing from the true scope and spirit of the invention.

BRIEF DESCRIPTION OF THE DRAWING

FIG. 1 is an elevation of a stable flexure blade assembly embodying the present invention.

FIG. 2 is a section along line 2—2.

FIG. 3. is a schematic of a coupling having axially opposed connecting rods, each connected to a pair of flexure blades according to the present invention.

DESCRIPTION

Figures 4, 5:
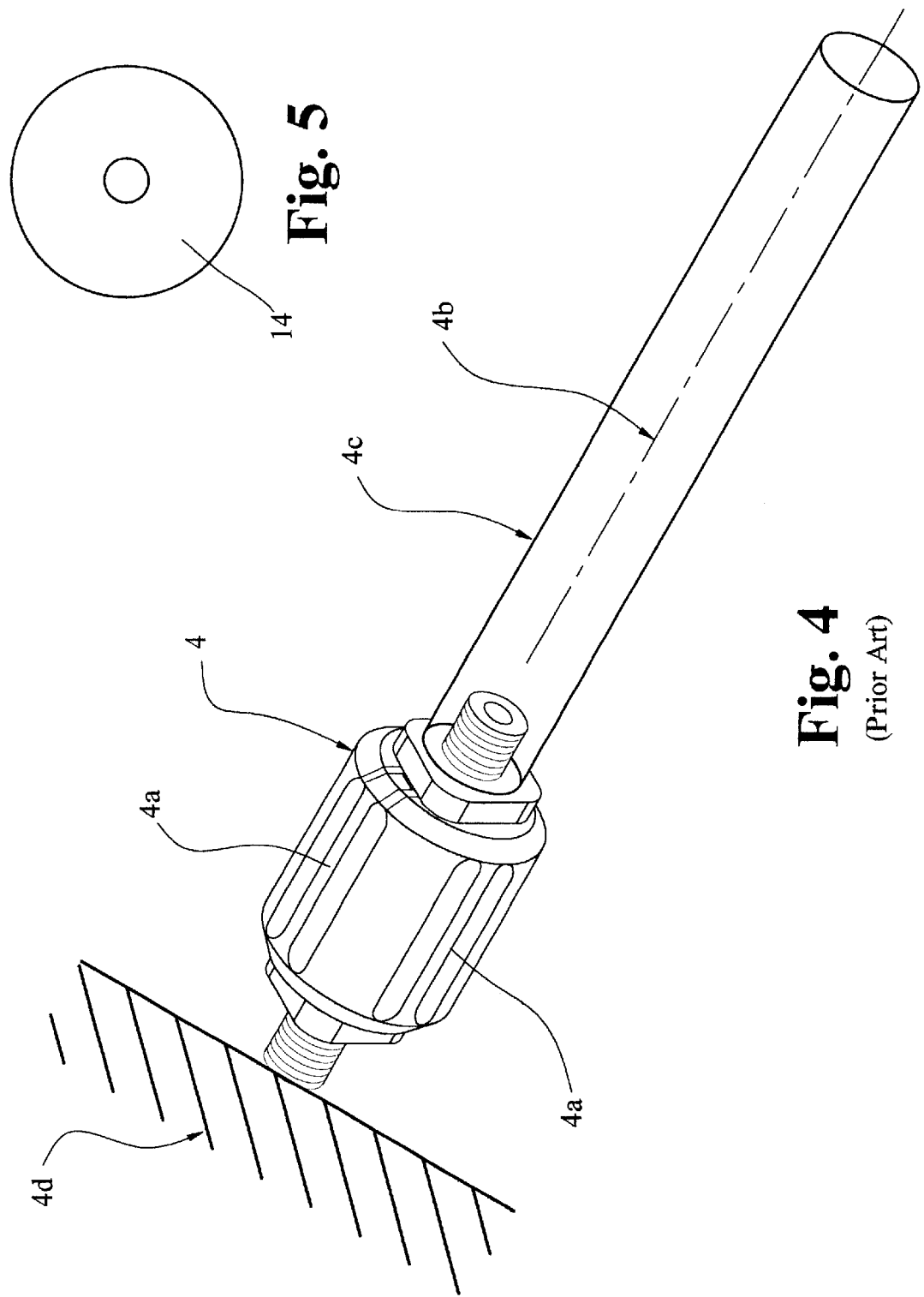
FIG. 4 shows a flexure coupling used in the prior art.
FIG. 5 is a section along line 5—5 in FIG. 3.
Figure 9:
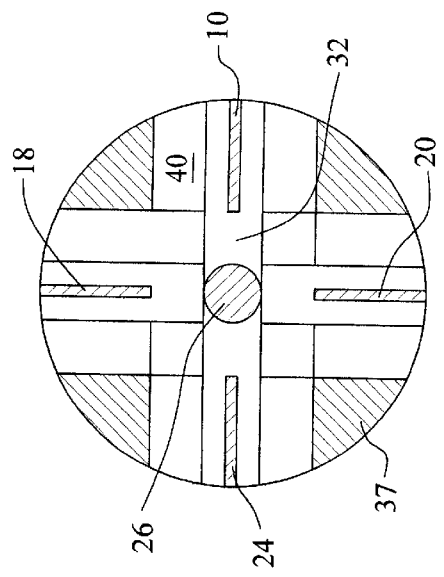
FIG. 9 is a section along 9—9 in FIG. 8.
Figure 8:
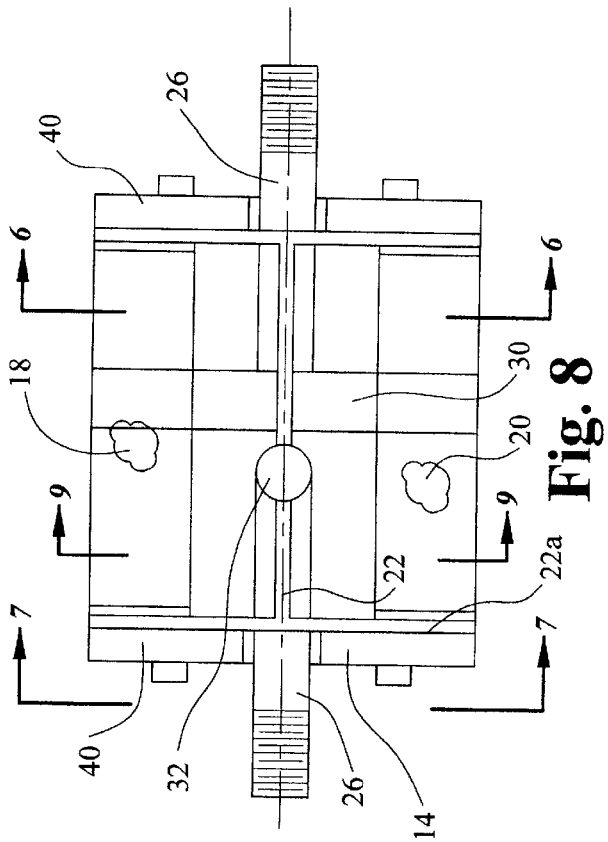
FIG. 8 is a side view of the present invention.
Figure 6:
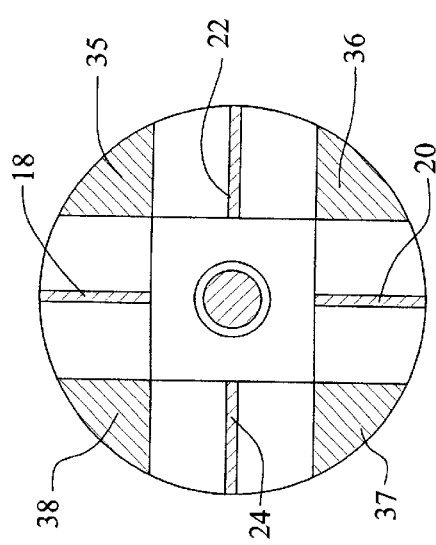
FIG. 6 is an section along 6—6 in FIG. 8.
Figure 7:
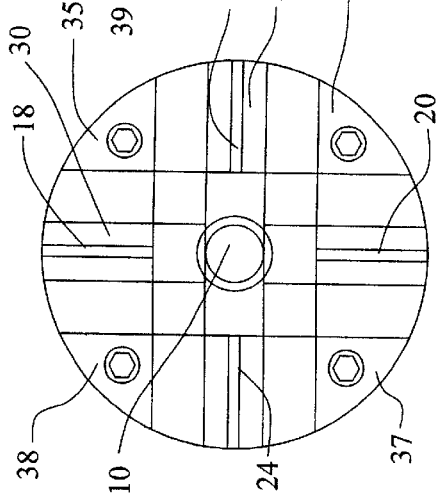
FIG. 7 is a section 7—7 along in FIG. 8.

In FIG. 1, a flexure blade assembly 9 includes a control rod 10 which is moveable around an axis 12 parallel to cross-member 30 to be able to flex or move (rotate slightly) with respect to fixed circular members 14 and 16. (See angle θ in FIG. 2) End members 14 and 16 are connected by thin, leaf like or blade type flexures 18, 20, made of a resilient metal, plastic or composite. It should be noted from schematic FIG. 3 that there are four blade flexures, first and second flexures 18, 20, as mentioned and third and fourth flexures 22, 24, all attached at their ends to the end members 14 and 16. Blade flexures 18, 20 are attached to control rod 10 through cross-member 30 and along a plane, as shown in FIG. 1. The second pair of blade flexures 22, 24 lie a long a plane normal to the plane of blade flexures 18, 20 and are attached to a second control rod 26 through cross-member 32. (See also FIGS. 6 through 9.)

Thus, the movement or slight rotation of control rod 10 is orthogonal to similar rotations of control rod 26 by the mechanical connection between the blade flexures and the end members, providing biaxial rotational compliance between the two control rods.

Control rod 10 is attached to a transverse bar or cross member 30 one end of which 30a is attached, e.g., welded, as close as possible to the middle of blade flexure 18, and likewise the other end 30b is attached to the middle of blade flexure 20. Control rod 26 is attached to transverse bar 32 which is similarly attached with its ends 32a, 32b as close as possible to the middle of its respective blade flexures 22, 24, while providing some clearance with transverse bar 30. The points 30c and 32c where the rods 10 and 26 attach to their respective bars 30 and 32 are the intermediate blade flexure points.

It will be appreciated that the coupling in FIGS. 1, 2 and 3 reacts axial loads both in compression and tension through the blade flexure points, such as 32c. The load path continues through the transverse bars and then through each blade flexure. The load path then splits with a portion of the load causing tension in one part of the blade flexure and another portion of the load causing compression in the other part of the blade flexure. The magnitude of the load reacted by each blade flexure segment is dependent on a few factors, since the axial load path becomes statically indeterminate. First, the location of the pivot point along the length of the blade determines relative stiffness by the blade and its reaction to axial loads. Another factor in determining load magnitude in each blade flexure portion is the compression portion of the blade flexure and its buckling stability. If the compression side is not stable to the load the flexure will buckle. The tension side must therefore react all the load. In other words, the reaction through the flexures and rods 10 and 26 puts the blade flexures in tension, minimizing the risk of buckling.

In one configuration, the length of each blade flexure 18, 20, 22, 24 is 0.75 inches, and the flexure is made of titanium 6A1-4V. The connection point 34 is 0.3 inches and the blade flexure is 0.013×0.3 inches in cross-section. (See FIG. 2.) If a blade with those characteristics is configured conventionally, as illustrated in FIG. 4, the buckling load for each blade flexure is 90 lbs. This is without adding the additional stresses encountered when the blade is flexed or slightly rotated as shown in FIG. 2. If a blade of the same dimensions and material make-up is configured as the present invention (intermediate blade flexure points), the allowable load for the flexure is increased to 200 pounds. This stable flexure continues to be structurally sound when reacting this load and experiencing 5 degrees (θ) of rotation.

FIGS. 6–9 show an embodiment of the basic flexure structure explained above, in assembly that is easy to fabricate. This embodiment uses four posts or separators 35, 36, 37 and 38, arranged diametrically and secured to rigid end members 40 by fasteners 39, forming a cage for the flexures 18, 20, 22, 24. In this embodiment, the flexures are given the previous numbers but are formed with integral bases, e.g., 22a, that are sandwiched between the rigid spacers 35, 36, 37, 38 and the end members 40. It can be seen that the mechanical combination of the end members and separators produces a rigid cage for the flexures while the connection between the two rods and is solely through the flexures 18, 20, 22, and 24 as explained previously, providing the same benefits.

In addition to any modifications and variations described previously, one skilled in the art may be able to make modifications to invention and its components and functions, in whole or in part, without departing from its true scope and spirit.

I claim:

1. A coupling, comprising:

a first member normal to a load axis;

a second member normal to said load axis at a first distance from the second member;

an aperture in said first member on said axis;

an aperture in said second member on said axis;

a first pair of flexures comprising first and second flexures connecting said member, said first and second flexures being parallel to said axis and diametrically opposed;

a second pair of flexures comprising third and fourth flexures connecting said members, said third and fourth flexures being parallel to said axis and diametrically opposed;

a first cross member normal to said axis and connected near the midpoints of the first and second flexures;

a first rod along said axis and extending through the aperture in said first member and attached to said first cross member;

a second cross member normal to said axis and connected near the midpoints of the third and fourth flexures; and a second rod along said axis and extending through the aperture in said second member and attached to said second cross member.

2. A coupling according to claim 1, further comprising:

a plurality of rigid separators that extend in parallel with the axis of said rods and are rigidly connect to said first and second end members.

3. A coupling according to claim 2, wherein:

each said flexure includes an integral base sandwiched between said first and second end members and said separators.

* * * * *